April 2, 1968  D. R. SCOTT  3,375,685
APPARATUS CONTROL SYSTEM AND METHOD
Filed Oct. 3, 1966  4 Sheets-Sheet 1

INVENTOR
DOUGLAS R. SCOTT
BY
Cauda & Cauda
HIS ATTORNEYS

INVENTOR
DOUGLAS R. SCOTT

BY

HIS ATTORNEYS

United States Patent Office 3,375,685
Patented Apr. 2, 1968

3,375,685
APPARATUS CONTROL SYSTEM AND METHOD
Douglas R. Scott, Greensburg, Pa., assignor to Robertshaw Controls Company, Richmond, Va., a corporation of Delaware
Filed Oct. 3, 1966, Ser. No. 583,604
14 Claims. (Cl. 68—12)

ABSTRACT OF THE DISCLOSURE

This disclosure relates to a control system for a washing machine wherein the normal cycles of operation of the washing machine are controlled by a program means that electrically interconnects an electrical power source to electrically operated control component means of the apparatus in a sequential pattern, the control system including a vacuum creating means that is actuated by the program control means to create a supply of pneumatic fluid to change the normal operation of one of the electrical component means, such as the variable speed drive means for the washing compartment and/or agitator of the washing machine.

---

This invention relates to an improved control system for an apparatus, such as a domestic washing machine or the like.

It is well known that conventional control systems for various appliances, such as domestic washing machines or the like, each includes a program control means for automatically and electrically interconnecting an electrical power source to electrically operated control component means of the apparatus in a sequential pattern determined by the control means to cause the component means to produce a predetermined cycle of operation of the apparatus.

This invention modifies such a conventional apparatus control system by providing pneumatically operated actuator means in combination with the electrical control system in such a manner that when the pneumatic operated actuator means is actuated in a manner hereinafter described, the actuated actuator means is adapted to change the normal operation of one of the electrically energized component means of the apparatus to produce a modified cycle of operation thereof.

For example, the pneumatic actuating means of this invention can be utilized to selectively vary the spin and/or agitation speed of a domestic washing machine or the like.

Therefore, it is an object of this invention to provide an improved apparatus control system having one or more of the novel features set forth above or hereinafter shown or described.

Other objects, uses and advantages of this invention are apparent from a reading of this description, which proceeds with reference to the accompanying drawings forming a part thereof and wherein.

Figure 1:
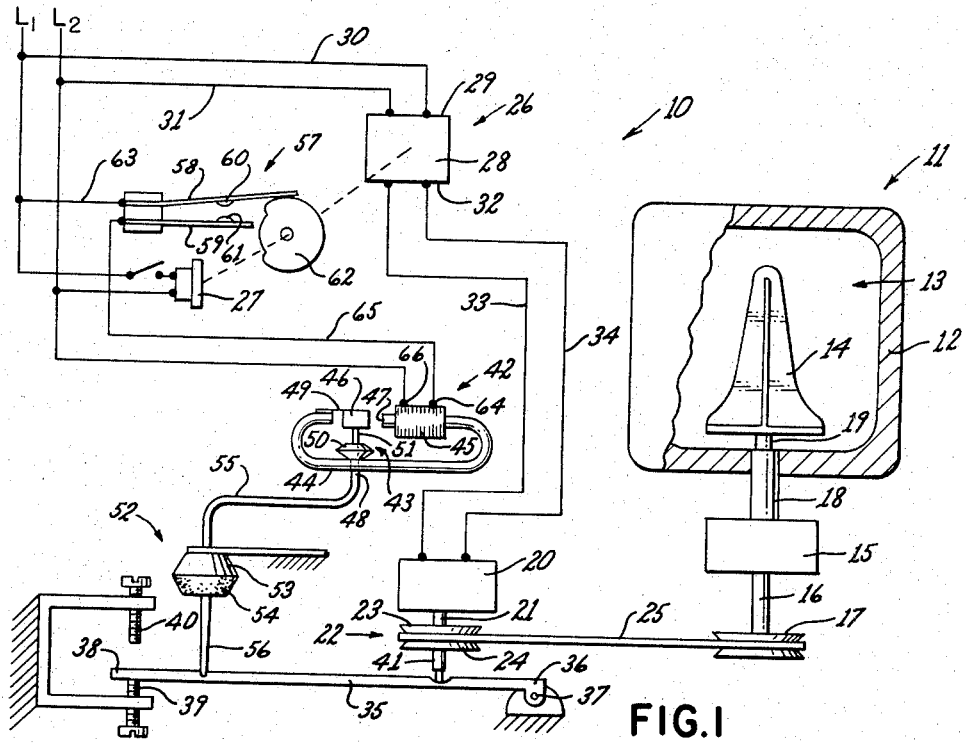
FIGURE 1 is a schematic view illustrating one improved control system and method of this invention.

While the various features of this invention are hereinafter described and illustrated as being particularly adaptable for providing a control system and method for a domestic washing machine or the like, it is to be understood that the various features of this invention can be utilized singly or in any combination thereof to provide control means for other devices as desired.

Therefore, this invention is not to be limited to only the embodiments illustrated in the drawings, because the drawings are merely utilized to illustrate some of the wide variety of uses of this invention.

Figure 2:
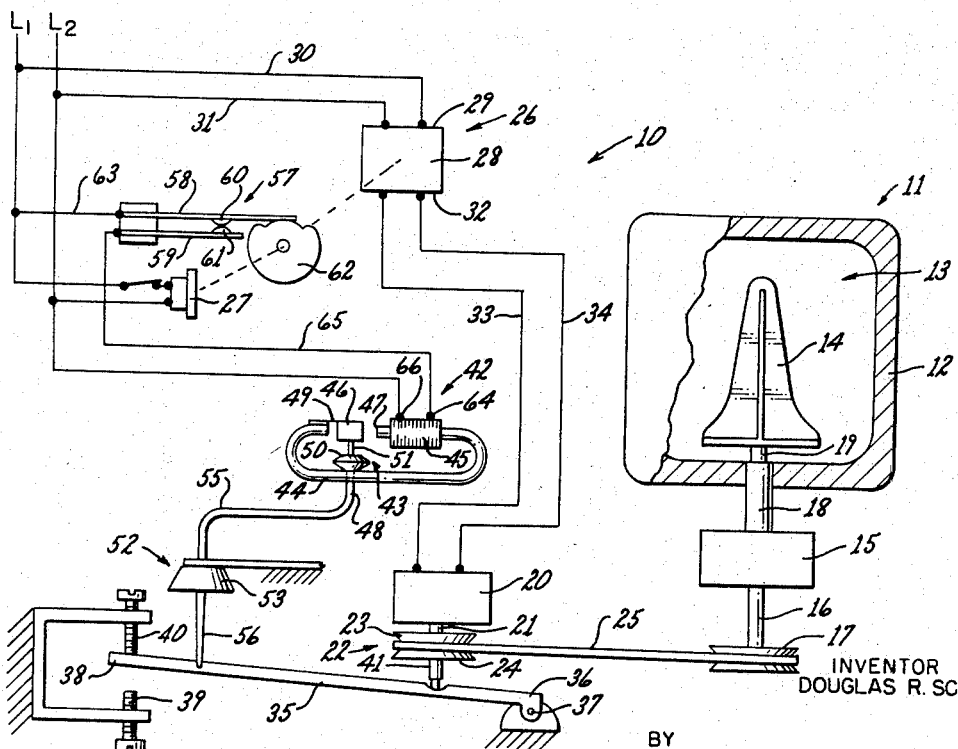
FIGURE 2 is a view similar to FIGURE 1 and illustrates the apparatus of FIGURE 1 in another operating position thereof.

Referring now to FIGURES 1 and 2, one embodiment of the improved apparatus control system and method of this invention is generally indicated by the reference numeral 10 and is being illustrated in combination with a domestic washing machine 11, the conventional washing machine 11 including a conventional washing compartment means 12 being adapted to receive laundry or the like in the compartment 13 thereof and be agitated therein by a conventional agitator 14.

A conventional transmission means 15 is provided so that when the input shaft 16 thereof is driven in the one rotational direction by a driven pulley means 17 fixed to the shaft 16, an output member 18 of the transmission means 15 will spin the washing compartment means 12 for a centrifuging operation in a manner well known in the art. Conversely, when the input shaft 16 is driven in the opposite rotational direction by the driven pulley 17, another output member 19 of the transmission means 15 will cause movement of the agitator 14 in a conventional manner.

In order to drive the driven pulley 17, a conventional, reversible electrical motor 20 is provided and has an output shaft means 21 carrying a variable speed pulley means 22, the variable speed pulley means 22 comprising a fixed sheave 23 and a movable sheave 24 whereby a continuous belt means 25 is looped around the pulley means 22 and 17 to cause rotation of the pulley means 17 and, thus, the input shaft 16 of the transmission means 15 when the electrical motor 20 is energized.

In this manner, the output shaft 21 of the motor 20 is driven in one direction to cause the transmission means 15 to spin the compartment means 12 when one circuit means of the motor 20 is electrically energized, and the output shaft 21 is driven in the opposite direction to cause the transmission means 15 to move the agitator 14 when other circuit means of the motor 20 is electrically energized.

A conventional electrically operated program control means 26 is utilized to control the cycle of operation of the apparatus 11 in a conventional manner and includes a manually operated on-off switch means 27 which when moved to its closed position as illustrated in FIGURE 2 will cause a program controlling member 28 to sequentially and automatically interconnect the conventional power source $L^1$ and $L^2$ to various electrically operated component means, such as the component means 20 previously described, in a sequential pattern determined by the program controlling member 28 to cause the sequentially energized component means to produce a predetermined cycle of operation of the apparatus 11.

For example, one side 29 of the electrically operated switching means or program member 28 can be interconnected to the power source means $L^1$ and $L^2$ by leads 30 and 31, the other side 32 of the program controlling member 28 being electrically interconnected to the component means or motor 20 by leads 33 and 34 whereby when the member 28 determines that the motor 20 should be energized in a manner to cause movement of the agitator 14, the member 28 interconnects the proper circuit means of the motor 20 across the leads L¹ and L² so that the transmission means 15 will drive the output member 19 for movement of the agitator 14. Conversely, when the member 28 determines that a centrifuging operation should take place, the member 28 interconnects the proper circuit means of the motor 20 across the leads L¹ and L² so that the same will cause the transmission means 15 to drive the output member 18 for centrifugal movement or spin of the washing compartment means 12 in a conventional manner.

Normally, the pulley means 22 and 17 are so constructed and arranged that the movable sheave 24 is disposed in its outermost position away from the fixed sheave 23 of the pulley means 22 so that the pulley means 22 will drive the driven pulley 17 at a minimum speed when the motor 20 is energized.

However, a suitable lever means 35 is provided and has one end 36 pivotally mounted at 37 while the free end 38 thereof is adaptable to be movable between adjustable stop means 39 and 40 in the manner illustrated in FIGURES 1 and 2. Suitable spring means are so constructed and arranged that the same tend to maintain the lever means 35 in the position illustrated in FIGURE 1 whereby the movable sheave 24, being operatively engageable and movable with the lever means 35 by interconnection means 41, is adapted to be disposed in its outermost position as illustrated in FIGURE 1 for minimum speed drive of the driven pulley 17.

When the free end 38 of the lever means 35 is pulled upwardly away from the stop means 39 and against the stop means 40 in the manner illustrated in FIGURE 2 in a manner hereinafter described, it can be seen that the lever means 35 moves the movable sheave 24 toward the fixed sheave 23 to increase the effective diameter of the variable speed pulley means 22 in the manner illustrated in FIGURE 2 so that the motor means 20 will now drive the input shaft 16 of the transmission means 15 at an increased speed, the maximum speed being determined by the position of the adjustable stop means 40, whereby the speed of spin of the compartment means 12 or the speed of movement of the agitator 14 will be correspondingly increased, depending on the particular direction of rotation of the output shaft 21 of the motor 20 when the lever 35 is in the maximum speed position of FIGURE 2.

A pneumatic fluid creating source means 42 of this invention is provided and, in the embodiment illustrated in the drawings, comprises a vacuum pump 43 carried on a frame member 44 along with an electromagnetic motor means 45 which, when energized, will cause an armature 46 to oscillate relative to a core means 47 of the motor means 45 and drive the pumping member of the vacuum pump 43 to create a vacuum in the outlet means 48 of the pump 43, the armature 46 being mounted to the frame means 44 in a cantilevered fashion on a leaf spring 49 and being operatively interconnected to a movable part 50 of the vacuum pump 43 by an interconnecting member 51 in the manner fully disclosed in the U.S. patent to Golden et al., No. 3,212,446.

A pneumatically operated actuator means 52 is provided and includes a cup-shaped housing member 53 fixed to the apparatus 11 and cooperating with a flexible diaphragm 54 to define a chamber therebetween which is disposed in fluid communication with the inlet means 48 of the vacuum pump 43 by a suitable conduit means 55. The flexible diaphragm 54 of the actuator 52 carries an actuating post means 56 pivotally interconnected to the lever means 35.

In this manner, when the chamber of the actuator means 52 is evacuated by the pneumatic fluid creating source means 42 being actuated in a manner hereinafter described, the flexible wall 54 of the actuator means 52 is drawn upwardly by the pressure differential created across the flexible diaphragm 54 by the vacuum pump 43 to pull the end 38 of the lever 35 upwardly in the manner illustrated in FIGURE 2 against the stop means 40 whereby the effective diameter of the variable pitch pulley means 22 is increased to now drive the input shaft 16 of the transmission means 15 at a maximum speed determined by the particular setting of the stop means 40. Conversely, when the pneumatic fluid creating source means 42 of this invention is deactuated, the atmosphere is adapted to return to the chamber of the actuator 52 so that the previously described spring means will cause the lever 35 to return back against the stop means 39 in the manner illustrated in FIGURE 1 so that the effective diameter of the variable pitch pulley means 22 is decreased whereby the motor means 20 will drive the input shaft 16 of the transmission means 15 at its minimum speed as determined by the particular setting of the stop means 39, the atmosphere returning to the chamber of the actuator 52 through a fixed orifice formed through the wall means 53 of the actuator 52 or by other suitable means.

The program member 28 of the system 10, when actuated or energized by the on-off member 27 being moved from its open position of FIGURE 1 to its closed position of FIGURE 2, is adapted to operate an electrical switch means 57 at one or more predetermined periods of time during the complete cycle of operation of the apparatus 11 as determined by the particular program means 28. For example, the switch means 57 can include a pair of blades 58 and 59 respectively having contacts 60 and 61 adapted to be placed into contact with each other when a cam member 62 is moved by the program member 28 from the position of FIGURE 1 to the position illustrated in FIGURE 2. Conversely, when the cam member 62 is moved to the position illustrated in FIGURE 1 by the program member 28, the cam member 62 moves the spring blade 58 away from the blade 59 whereby the contacts 60 and 61 are held out of contact with each other.

The contact blade 58 is adapted to be interconnected to the power source lead L¹ by a lead 63 while the contact blade 59 is adapted to be interconnected to one side 64 of the electromagnetic motor means 45 by a lead 65. The other side 66 of the motor means 45 is directly interconnected to the power source lead L². In this manner, when the switch means 57 is closed by the cam member 62 being moved to the position illustrated in FIGURE 2 by the program member 28, the electromagnetic motor means 45 of the pneumatic fluid creating source means 42 is placed across the power leads L¹ and L² so that the vacuum pump 43 is driven to create a vacuum in the inlet means 48 thereof to evacuate the chamber of the actuator means 52 to move the same from the position illustrated in FIGURE 1 to the position illustrated in FIGURE 2.

The operation of the control system and method 10 of this invention will now be described.

After the housewife or the like has placed the desired laundry in the washing compartment 13, the housewife or the like sets the program controlling member 28 for the desired cycle of operation of the apparatus 11 and closes the on-off member 27 to its on position illustrated in FIGURE 2 whereby the now energized program means 28 will automatically control the sequence of operation of the apparatus 11 in a conventional manner by sequentially energizing the electrically operated component means of the apparatus 11 in a conventional manner. However, if the program member 28 has been set for a particular cycle of operation of the apparatus 11 that requires an increased speed of the spin of the compartment means 12 and/or of the movement of the agitator 14, the program member 28 closes the switch means 57 to actuate the pneumatic fluid creating source means 42. The vacuum being created by the now actuated pump 43 will cause the diaphragm 54 of the actuator 52 to move from the position illustrated in FIGURE 1 to the position in FIGURE 2 so that the energized motor means 20 will drive the washing compartment means 12 and/or agitator 14 at its maximum speed in the manner previously described whereas when the program member 28 determines that the switch means 57 should be open during the operation of the motor 20, the motor means 20 will drive the washing compartment means 12 and/or agitator 14 at its minimum speed because the lever means 35 will be disposed in the normal position of FIGURE 1 as long as the pneumatic source creating means 42 is in a deenergized position as illustrated in FIGURE 1.

Thus, it can be seen that this invention uniquely integrates a pneumatic operated control means in a conventional electrically operated control system for the apparatus 11 so that the pneumatic operated means will modify the normal operation of an energized component means of the electrical system, the particular component means being modified in the embodiment 10 of this invention being the drive motor 20 of the apparatus 11 so that the effective output speed thereof will be modified by the pneumatic means of this invention.

While the embodiment 10 of this invention has been previously described as providing either a minimum speed of the transmission means 15 or a maximum speed thereof as illustrated respectively by FIGURES 1 and 2 and while the embodiment 10 has been described as the pneumatic fluid creating source means 42 being under direct control of the particular selected cycle of the program member 28, it is to be understood that the actuator means 52 of this invention can be so constructed and arranged that the same can infinitely vary the speed of the transmission means 15 within the minimum and maximum speeds thereof and that the housewife or the like can be provided with manual selection means for effecting or not effecting actuation of the pneumatic fluid source creating means 42 even through the cycle selected with the program member 28 calls for speed change in the manner described in connection with the embodiment of FIGURES 1 and 2.

For example, another embodiment of this invention is generally indicated by the reference numeral 10A and parts thereof similar to the system and method 10 of FIGURES 1 and 2 are indicated by like reference numerals followed by the reference letter A.

Figure 3:
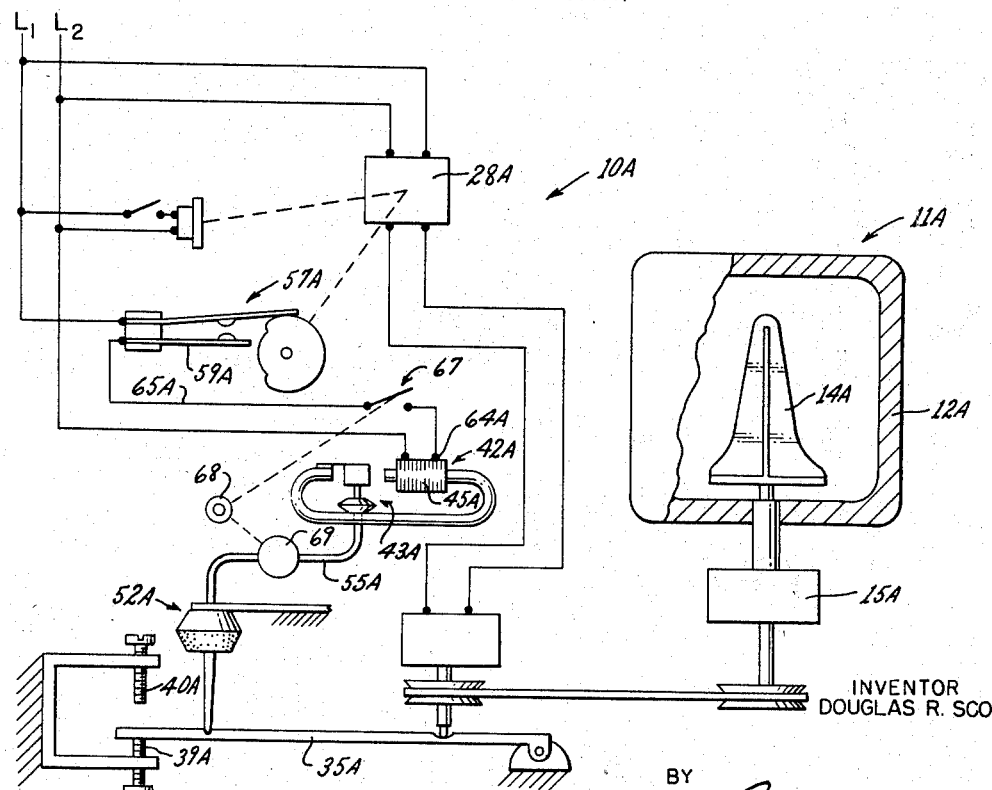
FIGURE 3 is a view similar to FIGURE 1 and illustrates another embodiment of this invention.

As illustrated in FIGURE 3, the control means 10A is substantially identical to the control means 10 previously described except that the manually operated electrical switch 57 of FIGURE 1 is disposed in the lead 65A interconnecting the switch blade 59A to the side 64A of the electromagnetic motor means 45A of the pneumatic fluid source creating means 42A, the switch being generally indicated by the reference numeral 57A.

In addition, a manually operated switch means 67 is disposed in the lead 65A and includes a selector knob or member 68 which will not only selectively open and close the switch means 67, but will also control the setting of a vacuum regulator means 69 disposed in the conduit 55A leading from the vacuum conduit 43A to the chamber of the actuator 52A.

For example, the vacuum regulator means 69 can comprise a regulator means that is fully disclosed in the U.S. Patent to Rice, No. 3,142,966. However, the regulator means 69 can comprise another type of regulator, as desired.

The operation of the control system 10A of this invention can now be described.

If the housewife or the like desires that the washing compartment means 12A and agitator 14A should be driven during the entire selected cycle of operation of the apparatus 11A at their minimum speed, the housewife or the like sets the selector switch 68 in a position thereof that holds the switch means 67 in its opened position as illustrated in FIGURE 3 whereby regardless of the operation of the program controlling member 28A closing the switch means 57A in the manner previously described, the pneumatic fluid creating source means 42A will not be energized whereby the lever means 35A will remain in its minimum speed setting position as illustrated in FIGURE 3.

However, should the housewife or the like desire a speed greater than the minimum speed for the spin of the washing compartment means 12A and/or of the agitator 14A, the housewife or the like turns the selector switch 68 to a desired setting thereof wherby the selector switch 68 not only closes the switch 67, but also adjusts the vacuum regulator 69 so that the same will tend to maintain a predetermined degree of evacuation in the chamber of the actuator 52A when the pneumatic fluid source creating means 42A is energized by the closing of the switch 57A under the control of the program member 28A.

For example, when the electromagnetic motor means 45A is energized by the switch 57A being closed by the program member 28A, the vacuum pump 43A will be operated and the degree of evacuation of the chamber 52A will be determined by the particular setting of the vacuum regulator 69 whereby the lever 35A will be moved upwardly from the position illustrated in FIGURE 3 to a new position thereof between the stop means 39A and 40A and will be held in such a position by the actuator 52A as long as the pneumatic fluid source creating means 42A is energized. In this manner, the transmission means 15A will be driven at a speed intermediate the minimum and maximum thereof. However, obviously, the vacuum regulator 69 can be set by the selector switch 68 so that the vacuum regulator 69 will permit the lever 35A to be drawn against the stop means 40A to drive the transmission means 15A at its maximum speed.

Thus, it can be seen that not only can the housewife or the like determine as to whether the speed of the spin of the washing compartment means 12A and/or speed of the agitator 14A is to be modified by the pneumatic means of this invention, but also the housewife or the like can infinitely vary the setting of the speed of the transmission means 15A between its minimum and maximum settings thereof through manual setting of the vacuum regulator 69.

While a two position speed control means has been described in connection with FIGURES 1 and 2 and an infinitely variable actuator means has been described in connection with FIGURE 3, it is to be understood that the pneumatic actuating means of this invention can be so constructed and arranged that the same controls the speed setting of the apparatus in various predetermined "steps."

Figure 4:
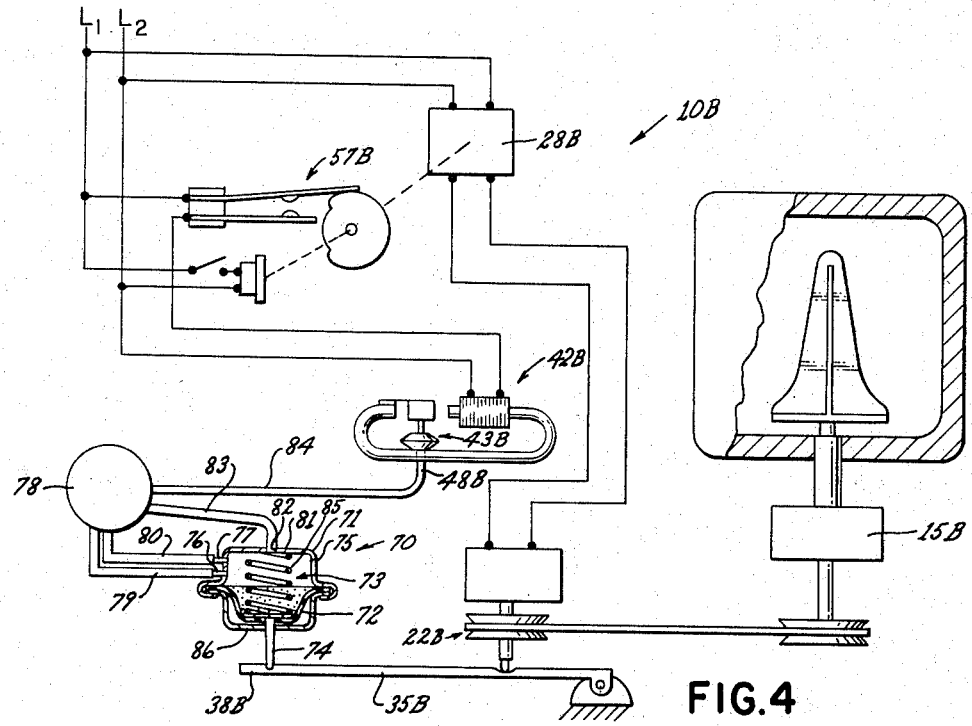
FIGURE 4 is a view similar to FIGURE 1 and illustrates still another embodiment of this invention.

For example, reference is now made to FIGURE 4 wherein another control means, control system and method of this invention is generally indicated by the reference numeral 10B and parts thereof similar to the control means 10 of FIGURES 1 and 2 are indicated by like reference numerals followed by the reference letter B.

As illustrated in FIGURE 4, the control means 10B of this invention is substantially identical to the control means 10 previously described except that a multi-position pneumatically operated actuator means 70 is provided in place of the previously described actuator means 52.

In particular, the multi-position pneumatically operated actuator means 70 of this invention includes a fixed cup-shaped housing 71 having its opened end closed by a flexible rolling diaphragm means 72 to define a chamber 73 therebetween, the rolling diaphragm 72 being interconnected to the lever 35B at the end 38B thereof by an actuating post means 74. The side wall means 75 of the cup-shaped housing 71 is provided with one or more openings 76 and 77 respectively interconnected to a selector valve means 78 by conduits 79 and 80. In addition, the closed end wall means 81 of the cup-shaped housing 71 has an opening 82 provided therein and being disposed in fluid communication with the selector valve means 78 by a conduit means 83.

The inlet means 48B of the vacuum pump 43B is disposed in fluid communication with the selector means 78 by a conduit means 84.

The operation of the control means 10B will now be described.

The selector means 78 is so constructed and arranged that should the housewife or the like set the selector means 78 in a position to produce the minimum speed of operation of the transmission means 15B, the selector switch 78 will not interconnect the inlet means 48B of the vacuum pump 43B to any of the conduits 79, 80 and 83 whereby the compression spring 85 disposed within the actuator 70 will maintain the flexible diaphragm 72 in its down position against a stop means 86 so that the lever 35B will be held in a position to provide a minimum output speed of the variable clutch pulley means 22B.

In this manner, even though the program member 28B closes the switch 57B to energize the pneumatic fluid creating source means 42B in the manner previously described, the selector means 78 is in a position to prevent evacuation of the chamber 73 of the pneumatically operated actuator means 70 during the entire cycle of operation of the control system 10B.

However, when the housewife sets the selector means 78 in a position to interconnect the conduit 79 with the source conduit 84, the actuation of the pneumatic fluid creating source means 42 by the program member 28B in the manner previously described will cause evacuation of the chamber 73 of the actuator 70 until the rolling diaphragm 72 is pulled upwardly by the pressure differential across the same in opposition to the force of the compression spring 85 and seals off the opening 76 from the chamber 73 so that further evacuation of the chamber 73 cannot take place. However, with the diaphragm 72 now being in a position to close off the inlet 76, the same has pivoted the lever 35B to a particular predetermined position thereof whereby the effective diameter of the variable clutch pulley means 22B has been increased to a predetermined setting thereof so that the transmission means 15B will now be driven at a predetermined speed greater than the minimum speed thereof as illustrated in FIGURE 4.

Thus, it can be seen that the selector means 78 can be manually set to interconnect the pneumatic fluid creating source means 42B to any one of the conduits 79, 80 or 83 to position the diaphragm 72 in various stepped positions thereof to position the lever 35B in various stepped positions thereof to produce various predetermined output speeds of the transmission means 15B.

Of course, when the pneumatic fluid creating source means 42B is deenergized, the selector means 78 and/or actuator means 70 can be so constructed and arranged that the atmosphere is adapted to return to the chamber 73 thereof so that the compression spring 85 will return the lever means 35B and diaphragm 72 to its normal position illustrated in FIGURE 4 wherein a minimum speed setting of the transmission means 15B would be provided.

While the various embodiments of this invention have been previously described as having the pneumatic fluid source creating means being utilized only to modify the component means 20, it is to be understood that the pneumatic fluid creating source means of this invention can also be utilized to operate other component means of the apparatus or the like.

Figure 5:
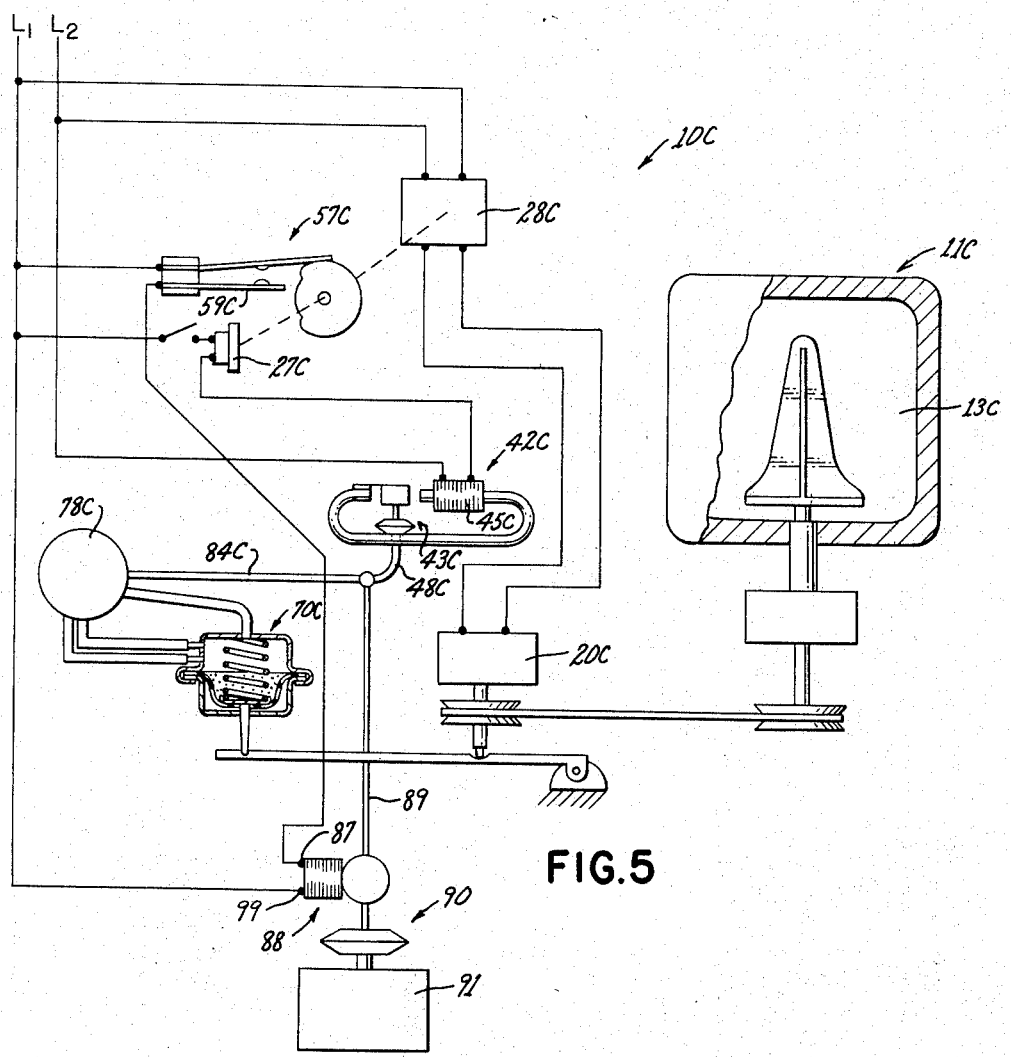
FIGURE 5 is a view similar to FIGURE 1 and illustrates another embodiment of this invention.

For example, reference is now made to FIGURE 5 wherein another apparatus control system and method of this invention is generally indicated by the reference letter 10C and parts thereof similar to the apparatus 10, 10A and 10B will be indicated by like reference numerals followed by the reference letter C.

As illustrated in FIGURE 5, the control means 10C of this invention is substantially identical to the control system 10B previously described except that the pneumatic fluid creating source means 42C is adapted to be directly actuated whenever the on-off member 27C is moved to its on position as the on-off member 27C directly interconnects the electromagnetic motor means 45C across the power source leads L¹ and L². However, the selector means 78C and actuator means 70C are adapted to modify the drive motor means 20C in the same manner as previously described for the control means 10B.

In addition, a switch means 57C is provided in the system 10C with the switch means 57C being substantially identical to the switch means 57 previously described and operated by the program member 28C of the system 10C in the manner previously described. However, the switch blade 59C of the switch means 57C is interconnected to one side 87 of a solenoid operated valve means 88 while the other side 99 thereof is interconnected to the power source lead L¹.

The solenoid operated valve means 88 is disposed in a branch conduit 89 leading from the conduit means 84C that is interconnected to the inlet means 48C of the vacuum pump 43C, the conduit means 89 being adapted to be fluidly interconnected to a chamber of a pneumatically operated actuator means 90 only when the valve means 88 is opened by the solenoid thereof being electrically energized. In this manner, the actuator 90, when actuated, can operate a component means 91 of the apparatus 11C for any suitable purpose. For example, the component means 91 can be a detergent dispenser for the apparatus 11C, if desired.

Thus, when the program member 28C determines that the component means 91 should be operated, the program member 28C closes the switch 57C to energize the solenoid operated valve means 88 and, thus, open the conduit 89 so that the actuator 90 will be interconnected to the continuously running vacuum pump 43C whereby the actuator 90 will be evacuated to operate the component means 91 to dispense detergent or the like into the washing compartment 13C of the apparatus 11C. Conversely, when the switch means 57C is opened, the solenoid operated valve means 88 closes the conduit 89 from the actuator 90 to deactuate the same, the actuator 90 returning to its normal atmospheric condition in the manner previously described on the actuator 52, if desired.

Accordingly, it can be seen that the pneumatic fluid creating source means of this invention can also be utilized to operate other component means of the apparatus or the like and still be effective to modify the normal operation of at least one component means of the apparatus.

While various switch means and the like have been previously described for causing actuation of the pneumatic fluid creating source means of this invention, the control system can be so constructed and arranged that the particular component means to be modified by the pneumatic fluid of this invention can directly actuate the pneumatic fluid creating source means only when that particular component means is electrically energized by the conventional electrical control means.

Figure 6:
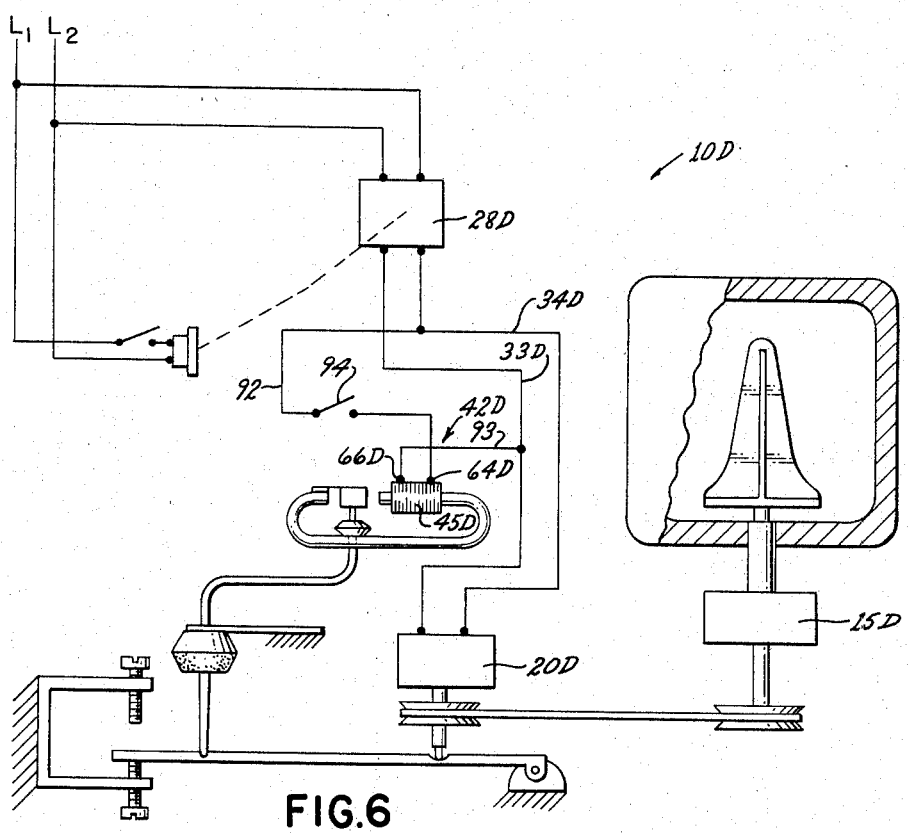
FIGURE 6 is a view similar to FIGURE 1 and illustrates still another embodiment of this invention.

For example, reference is now made to FIGURE 6 wherein another control system and method of this invention is generally indicated by the reference numeral 10D and parts thereof similar to the systems 10, 10A, 10B and 10C will be indicated by like reference numerals followed by the reference letter D.

As illustrated in FIGURE 6, the control means 10D of this invention is substantially identical to the control means 10 previously described except that the pneumatic fluid creating source means 42D is not energized by the cam operated switch means 57 previously described.

In particular, the side 64D of the electromagnetic motor means 45D is interconnected by a branch lead 92 to the lead 34D that interconnects one side of the motor means 20D to the program member 28D. The other side 66D of the electromagnetic motor means 45D is interconnected by a branch lead 93 to the lead 33D that also interconnects the motor means 20D to the program member 28D.

If desired, a manually operated selector switch 94 can be disposed in the lead 92 to be manually controlled by the housewife or the like.

In any event, when the switch 94 is closed or is not provided, the direct electrical energizing of the motor 20D by the program member 28D placing the motor means 20D across the power source leads L¹ and L² also places the electromagnetic motor means 45D across the power leads L¹ and L² so that the pneumatic fluid creating source means 42D will only be energized or actuated when the component means 20D is energized. The selector switch 94 is provided in the embodiment illustrated in FIGURE 6 so that if the housewife does not desire to have the speed of the transmission means 15D changed from its minimum speed condition during a particular cycle selected with the program member 28D, the pneumatic fluid creating source means 42D will not be energized when the motor 20D is energized by the program member 28D.

However, it can be seen that the component means 20D to be modified by the pneumatically operated means of this invention is adapted to directly control the actuation of such pneumatically operated means.

Figure 7:
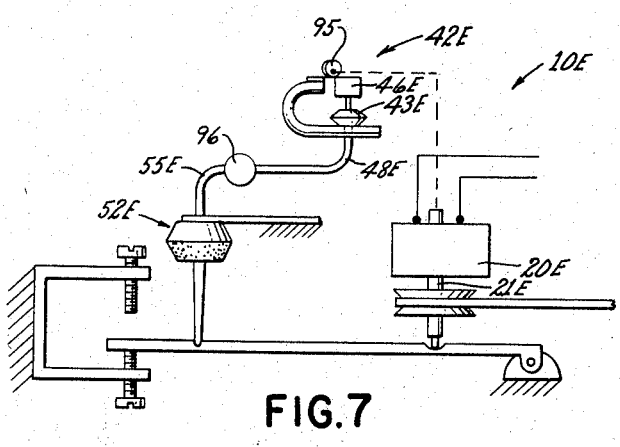
FIGURE 7 is a fragmentary view similar to FIGURE 1 and illustrates still another embodiment of this invention.

Another such arrangement is provided in FIGURE 7 wherein the control system and method of this invention is generally indicated by the reference numeral 10E and parts thereof similar to the control systems and methods 10, 10A, 10B, 10C and 10D previously described are indicated by like reference numerals followed by the reference letter E.

As illustrated in FIGURE 7, the control means 10E of this invention is substantially identical to the control means 10 illustrated in FIGURES 1 and 2 except that the pneumatic fluid creating source means 42E does not include the electromagnetic motor means 45 previously described as the vacuum pump 43E is directly and mechanically operated by the drive motor means 20E when the motor 20E is electrically energized in the manner previously described.

In particular, the output shaft means 21E of the motor means 20E is adapted to mechanically drive or rotate an eccentric 95 operatively engaging the armature 46E of the pump 43E whereby rotation of the shaft means 21E of the motor means 20E will cause rotation of the eccentric 95 to operate the fluid pump 43E in the same manner as when the armature 46 is being operated by the electromagnetic motor 45 in the manner previously described for the embodiment of FIGURES 1 and 2.

Also, the conduit means 55E leading from the inlet 48E of the vacuum pump 43E to the pneumatically operated actuator means 52E can have a manually operated selector valve 96 disposed therein for selectively opening or closing the conduit 55E so that the housewife has the choice of either having the pump 43E interconnected to the actuator 52 for a speed modification or preventing such interconnection therebetween so that the transmission means will be driven at the minimum speed in the manner previously described.

Accordingly, it can be seen that the control means 10E illustrated in FIGURE 7 is adapted to have pneumatic fluid creating source means 42E thereof directly actuated when the motor means 20E is energized by the conventional control system when the valve means 96 is open whereby the vacuum pump 43E will only be operating during the cycle of the apparatus 11E at a time when the vacuum pump 43E could be utilized to modify the operation of the drive motor 20E.

Thus, it can be seen that this invention provides improved control systems wherein conventional electrical control systems for washing machines and the like can have the normal operation of one or more of the electrically energized component means thereof modified to produce a modified function thereof by pneumatically operated means of this invention that is integrated into such conventional electrical control means.

While the form of the invention now preferred has been disclosed as required by the statutes, other forms may be used, all coming within the scope of the claims which follow.

What is claimed is:

1. In an apparatus control system having program control means for electrically interconnecting an electrical power source to electrically operated control component means of said apparatus in a sequential pattern determined by said program control means to cause said component means to produce a predetermined cycle of operation of said apparatus, the improvement comprising a pneumatic fluid creating source means, said program control means actuating said source means to create a supply of said pneumatic fluid, and pneumatically operated actuator means operatively controlled by said source means for changing the normal operation of one of said component means.

2. In a system as set forth in claim 1, the further improvement wherein said one component means of said apparatus comprises a variable output speed means of said apparatus and wherein said pneumatically operated actuator means changes the setting of said variable speed means to produce a predetermined output thereof.

3. In a system as set forth in claim 2, the further improvement wherein said apparatus comprises a laundry machine having a washing compartment means for spinning laundry disposed therein and washing agitator means for agitating said laundry in said washing compartment and wherein said variable output means of said apparatus drives at least one of said washing means whereby said pneumatically operated actuator means is adapted to produce a predetermined drive of at least said one washing means of said apparatus.

4. In a system as set forth in claim 3, the further improvement wherein another pneumatically operated actuator means is adapted to be operatively controlled by said source means to operate another component means of said apparatus, said program means operatively interconnecting said source means to said other pneumatcially operated actuator means to operate said other component means during a predetermined portion of said cycle.

5. In a system as set forth in claim 2, the further improvement wherein said pneumatically operated actuator means is a multi-position actuator to change the settings of said variable speed means in a stepped relation.

6. In a system as set forth in claim 2, the further improvement wherein said pneumatically operated actuator means is an infinitely variable actuator means to change the setting of said variable speed means in an infinite manner between the limits of said variable speed means.

7. In a system as set forth in claim 1, the further improvement wherein said pneumatic fluid creating source comprises a fluid pump means.

8. In a system as set forth in claim 7, the further improvement wherein said program means operates an electrical switch during a predetermined portion of said cycle and wherein said fluid pump means includes an electromagnetic motor means that is adapted to be operated by said switch to drive said fluid pump means during said predetermined portion of said cycle.

9. In a system as set forth in claim 8, the further improvement of a manually operated selector switch for selectively rendering the operation of said electrical switch by said program means effective or ineffective in regards to said fluid pump means.

10. In a system as set forth in claim 7, the further improvement wherein said one component means and said fluid pump means are so constructed and arranged that when said program means interconnects said electrical source to said one component means to operate the same, the same means of said program means that energizes said one component means is adapted to also cause operation of said fluid pump means to create said pneumatic fluid whereby said pneumatic fluid is only adapted to be created when said one component means is energized.

11. In a system as set forth in claim 10, the further improvement wherein said fluid pump means includes an electromagnetic motor means that is adapted to be electrically energized at the same time that said one component means of said apparatus is energized by said program means.

12. In a system as set forth in claim 10, the further improvement wherein said fluid pump means has a pumping member and wherein said one component means mechanically drives said pumping member when said one component means is energized.

13. In a system as set forth in claim 12, the further improvement wherein said one component means is an electrically operated drive motor of said apparatus.

14. In a system as set forth in claim 13, the further improvement wherein said pumping member is secured to a leaf spring means and wherein the output shaft of said electrically operated drive motor drives an eccentric against said leaf spring means to cause movement of said pumping member.

References Cited

UNITED STATES PATENTS

| | | | |
|---|---|---|---|
| 3,152,461 | 10/1964 | Glover | 68—24 X |
| 3,318,116 | 5/1967 | Houser et al. | 60—60 X |

WILLIAM I. PRICE, *Primary Examiner.*